(12) United States Patent
Huang et al.

(10) Patent No.: US 11,453,311 B2
(45) Date of Patent: Sep. 27, 2022

(54) BATTERY THERMAL MANAGEMENT SYSTEM, CONTROL METHOD AND DEVICE OF BATTERY HEATING SYSTEM, DEVICE AND MEDIUM

(71) Applicant: Contemporary Amperex Technology Co., Limited, Ningde (CN)

(72) Inventors: Xiaojian Huang, Ningde (CN); Xiong Zheng, Ningde (CN); Xiyang Zuo, Ningde (CN); Zhimin Dan, Ningde (CN); Bao Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/541,296

(22) Filed: Dec. 3, 2021

(65) Prior Publication Data
US 2022/0219568 A1    Jul. 14, 2022

Related U.S. Application Data

(63) Continuation of application No. PCT/CN2021/070921, filed on Jan. 8, 2021.

(51) Int. Cl.
*B60L 58/27* (2019.01)
*H01M 10/615* (2014.01)
*H01M 10/63* (2014.01)
*H01M 10/48* (2006.01)
*H01M 10/42* (2006.01)
*H05B 1/02* (2006.01)
(Continued)

(52) U.S. Cl.
CPC ............... *B60L 58/27* (2019.02); *B60L 53/20* (2019.02); *H01M 10/425* (2013.01); *H01M 10/486* (2013.01); *H01M 10/615* (2015.04); *H01M 10/63* (2015.04); *H01M 10/657* (2015.04); *H05B 1/0236* (2013.01); *B60L 2240/42* (2013.01); *B60L 2240/545* (2013.01); *H01M 2010/4271* (2013.01); *H02P 27/06* (2013.01)

(58) Field of Classification Search
None
See application file for complete search history.

(56) References Cited

FOREIGN PATENT DOCUMENTS

| CN | 103825060 A | 5/2014 |
|---|---|---|
| CN | 103701381 B | 6/2016 |

(Continued)

OTHER PUBLICATIONS

The International search report for PCT Application No. PCT/CN2021/070921, dated Sep. 18, 2021, 12 pages.

*Primary Examiner* — Sarah A. Slifka
(74) *Attorney, Agent, or Firm* — East IP P.C.

(57) ABSTRACT

The present application provides a battery thermal management system, a control method and device of a battery heating system, a device, and a medium. The method includes: acquiring a temperature rise rate parameter of the battery; determining proportions of a square wave signal and a sine wave signal in a first control signal of the switch components according to the temperature rise rate parameter; generating the first control signal of the switch components according to the proportions of the square wave signal and the sine wave signal; outputting the first control signal to the switch components to control switching on or off of the switch components via the first control signal, so as to generate an alternating current in a loop connecting the battery and the motor and heat the battery using the alternating current.

13 Claims, 6 Drawing Sheets

(51) Int. Cl.
*B60L 53/20* (2019.01)
*H01M 10/657* (2014.01)
*H02P 27/06* (2006.01)

(56) References Cited

FOREIGN PATENT DOCUMENTS

| | | |
|---|---|---|
| CN | 110970672 A | 4/2020 |
| CN | 112133987 A | 12/2020 |
| JP | 2010246312 A | 10/2010 |

BATTERY THERMAL MANAGEMENT SYSTEM, CONTROL METHOD AND DEVICE OF BATTERY HEATING SYSTEM, DEVICE AND MEDIUM

CROSS-REFERENCE TO RELATED APPLICATION

This application is a continuation of International Application No. PCT/CN2021/070921 entitled "BATTERY THERMAL MANAGEMENT SYSTEM, CONTROL METHOD AND DEVICE OF BATTERY HEATING SYSTEM, DEVICE AND MEDIUM" and filed on Jan. 8, 2021, which is incorporated herein by reference in its entirety.

TECHNICAL FIELD

This application relates to a field of batteries, and in particular, to a battery thermal management system, a control method and device of a battery heating system, a device, and a medium.

BACKGROUND

At present, a battery has a wide range of applications, such as electric vehicles, electric ships, electric forklifts, and so on. The battery may include a lithium iron phosphate battery, a ternary battery, which is not limited here. Nevertheless, due to a limitation of battery materials, the battery can stably exert a best performance only at a rated ambient temperature. Therefore, when using in a scene with a low ambient temperature, the battery needs to be heated.

An existing battery heating method is an indirect heating method. The indirect heating method refers to placing a heat source outside the battery for heating. Nevertheless, because the battery is heated by an external heat source, heat loss will occur on a heat transfer medium. Therefore, an efficiency of the indirect heating method is not high, and a heating quality and a heating efficiency cannot be both taken into account.

SUMMARY

In view of this, the present disclosure provides a battery thermal management system and a control method and device of a battery heating system.

In a first aspect, a control method of a battery heating system is provided. The battery heating system includes an inverter and a motor, and the motor is connected to a battery via switch components in the inverter;

the method includes:
acquiring a temperature rise rate parameter of the battery;
determining proportions of a square wave signal and a sine wave signal in a first control signal of the switch components according to the temperature rise rate parameter;
generating the first control signal of the switch components according to the proportions of the square wave signal and the sine wave signal;
outputting the first control signal to the switch components to control switching on or off of the switch components via the first control signal, so as to generate an alternating current in a loop connecting the battery and the motor and heat the battery using the alternating current.

In a second aspect, a control device of a battery heating system is provided, and the control device includes:
a parameter acquisition module configured to acquire a temperature rise rate parameter of the battery;
a processing module configured to determine proportions of a square wave signal and a sine wave signal in a first control signal of the switch components according to the temperature rise rate parameter;
a signal generating module configured to generate the first control signal of the switch components according to the proportions of the square wave signal and the sine wave signal;
a signal transmission module configured to output the first control signal to the switch components to control switching on or off of the switch components via the first control signal, so as to generate an alternating current in a loop connecting the battery and the motor and heat the battery using the alternating current.

In a third aspect, a battery thermal management system is provided, and the system includes:
a battery heating system and a controller;
wherein the battery heating system includes an inverter and a motor, the motor includes a multi-phase stator winding, and the multi-phase stator winding is connected to a battery via switch components in the inverter; and
the controller is configured to execute the control method of the battery heating system provided by the first aspect and any embodiment of the first aspect.

In a fourth aspect, a control device of a battery heating system is provided, and the control device includes:
a processor and a memory storing computer program instructions;
the processor reads and executes the computer program instructions to implement the control method of the battery heating system provided by the first aspect and any embodiment of the first aspect.

In a fifth aspect, a computer readable storage medium is provided, wherein computer programs are stored on the computer readable storage medium, and the computer programs, when executed by a processor, implement the control method of the battery heating system provided by the first aspect and any embodiment of the first aspect.

BRIEF DESCRIPTION OF THE DRAWINGS

The drawings required to describe embodiments of the present application are introduced briefly below to illustrate technical solutions of the embodiments of the present application more clearly. Obviously, the drawings described below are only some embodiments of the present application, and other drawings may be obtained by those ordinary skilled in the art from those drawings without any creative work.

DETAILED DESCRIPTION

Figure 1:
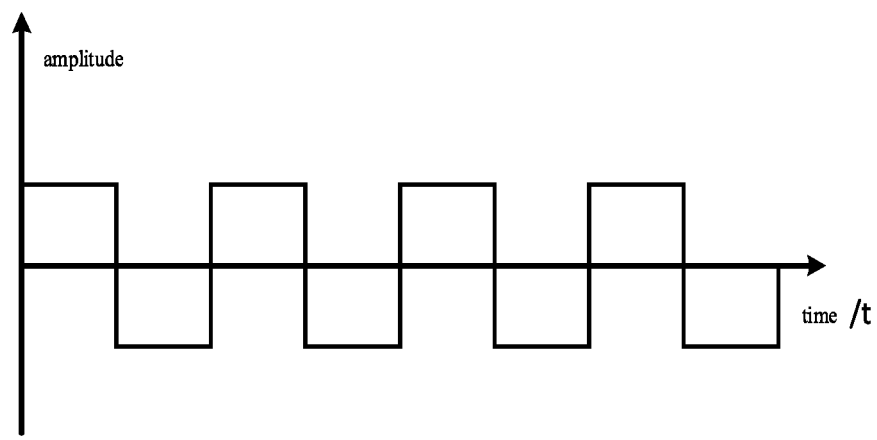
FIG. 1 is a waveform schematic diagram of a square wave provided by an embodiment of the present application.

In order to make the objects, technical solutions and advantages of the embodiments of the present application more clear, the technical solutions in the embodiments of the present application will be described clearly and completely in conjunction with the drawings in the embodiments of the present application. Obviously, the described embodiments are only a part of the embodiments of the present application, but not all of the embodiments. All other embodiments obtained by those ordinary skilled in the art based on the embodiments in the present application without any creative work shall fall within the protection scope of the present application.

The terms used in the embodiments of the present application are only for the purpose of describing specific embodiments, and are not intended to limit the present application. The singular forms of "a", "an" and "this" used in the embodiments of the present application and the appended claims are also intended to include the plural forms, unless the context clearly indicates other meanings.

It should be understood that the term "and/or" used herein is only an association relationship describing associated objects, which means that there may be three relationships, for example, A and/or B means that A alone, both A and B, and B alone.

Hereinafter, "first", "second" and the like are only used for descriptive differences, and have no other special meanings.

The embodiments of the present application provide a battery thermal management system, a control method and device, a device, and a medium, which can be applied to a scenario of heating a battery at a lower temperature. For example, they can be applied to specific scenarios where the temperature of the battery is increased by heating the battery to reach a temperature at which the battery can be used normally. Specifically, in the embodiments of the present application, in the process of heating the battery, a first control signal of switch components of an inverter may be determined according to a temperature rise rate parameter of the battery, which can reduce power consumption and improve flexibility of the battery heating system.

Firstly, in order to provide a better understanding of the present application, the embodiments of the present application give specific explanations on concepts such as a battery, a square wave, a sine wave, and a hybrid wave.

(1) For the battery, the battery in the embodiments of the present application may be a lithium ion battery, a lithium metal battery, a lead acid battery, a nickel cadmium battery, a nickel hydrogen battery, a lithium sulfur battery, a lithium air battery, or a sodium ion battery and the like, which is not limited here. In terms of scale, the battery to be tested may be a single battery cell, a battery module or a battery pack, which is not limited here. In terms of application scenarios, the battery may be used in a power plant such as a vehicle and a ship. For example, the battery may be used in an electric vehicle as a power source of the electric vehicle, so as to supply power to a motor of the electric vehicle. The battery may also supply power to other electrical devices in the electric vehicle, such as an onboard air conditioner, a car player and the like.

(2) For the square wave, FIG. 1 is a waveform schematic diagram of a square wave provided by an embodiment of the present application. Here, a horizontal axis of FIG. 1 is time, and a vertical axis is amplitude. As shown in FIG. 1, in the embodiment of the present application, the square wave refers to a wave whose waveform is rectangular in the time domain.

The applicant has conducted a lot of experimental research, and the specific research content is as follows.

When a square wave and a sine wave with a same amplitude and frequency are used to control the switch components, and assuming that the amplitude of the square wave and the sine wave is a, formula (1) may be obtained by Fourier decomposition of the waveform of the square wave at time t:

$$f(t) = \frac{4a}{\pi}\left(\sin wt + \frac{1}{3}\sin 3wt + \frac{1}{5}\sin 5wt + \frac{1}{7}\sin 7wt + \ldots\right) \quad (1)$$

wherein t represents a time and w represents an angular velocity.

At this time, an amplitude of a fundamental wave component contained in the square wave has exceeded the amplitude of the sine wave, and the amplitude of the fundamental wave is increased by about 27% compared to the amplitude of the sine wave.

Therefore, the applicant found that compared to the sine wave, when the square wave is used as the control signal of the switch components, the heating efficiency of the battery may be improved.

Figure 2:
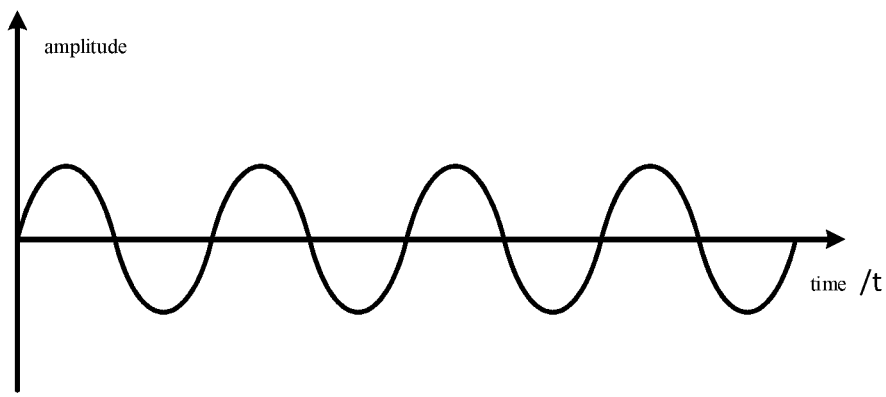
FIG. 2 is a waveform schematic diagram of a sine wave provided by an embodiment of the present application.

(3) For the sine wave, FIG. 2 is a waveform schematic diagram of a sine wave provided by an embodiment of the present application. Here, a horizontal axis of FIG. 2 is time, and a vertical axis is amplitude. As shown in FIG. 2, in the embodiment of the present application, the amplitude of the sine wave changes sinusoidally with time.

The applicant has conducted a lot of experimental research, and the specific research content is as follows.

According to the above formula (1), the applicant found that the square wave contains 5, 7, or even more low-order harmonics. The low-order harmonics will cause torque fluctuations of the motor and additional rotor eddy-current loss, thereby affecting the heating quality of the battery.

In addition, in some embodiments, when the rotor of the motor needs to be in a stationary state, the torque fluctuations and the rotor eddy-current loss caused by the low-order harmonics will affect the stationary state of the rotor, thereby affecting the heating quality of the battery.

Nevertheless, compared with the square wave, the sine wave does not have the influence of the low-order harmonics, and the heating quality can be improved.

Figure 3:
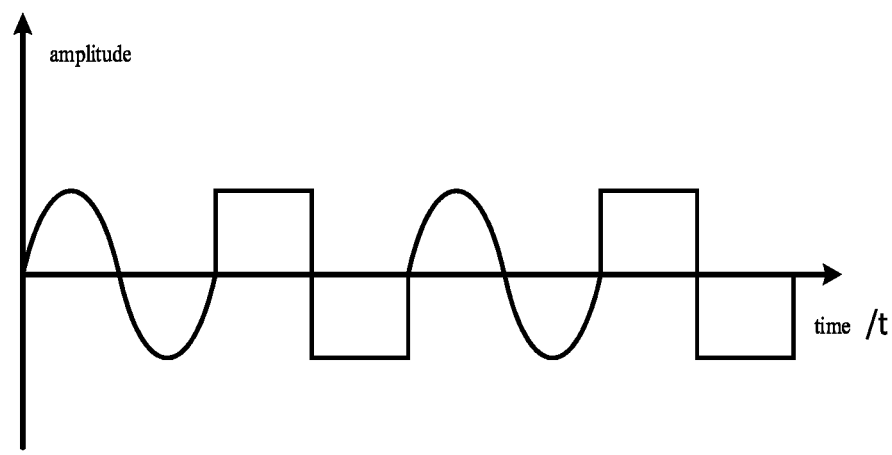
FIG. 3 is a waveform schematic diagram of a hybrid wave provided by an embodiment of the present application.

(4) For the hybrid wave, FIG. 3 is a waveform schematic diagram of a hybrid wave provided by an embodiment of the present application. Here, a horizontal axis of FIG. 3 is time, and a vertical axis is amplitude. In the embodiment of the present application, the hybrid wave may be regarded as a wave formed by splicing a sine wave and a square wave. As shown in FIG. 3, the amplitude of the hybrid wave may change in a regular manner of the square wave in some periods, and may change in a regular manner of the sine wave in other periods.

After introducing the above concepts, in order to provide a fully understanding of the present application, the embodiments of the present application will give a detailed description of the battery thermal management system.

From the perspective of use, the battery thermal management system ensures that the battery works within a suitable temperature range. The main function of the battery thermal management system is to accurately measure and control the battery temperature. Due to the limitation of the battery materials, such as lithium batteries, the best performance can only be achieved stably at a rated cell temperature. Therefore, the battery needs to be heated when the temperature is too low, such as below a temperature threshold.

Figure 4:
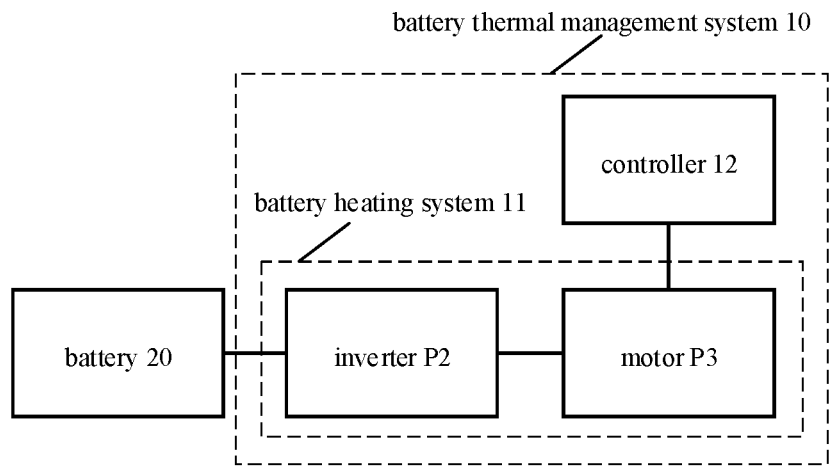
FIG. 4 is a system architecture diagram of a battery thermal management system provided by an embodiment of the present application.

FIG. 4 is a system architecture diagram of a battery thermal management system provided by an embodiment of the present application. As shown in FIG. 4, the battery thermal management system 10 includes a battery heating system 11 and a controller 12 for the battery heating system. Here, the battery heating system 11 includes an inverter P2 and a motor P3.

Firstly, for the battery heating system 11, the specific description is as follows.

Figure 5:
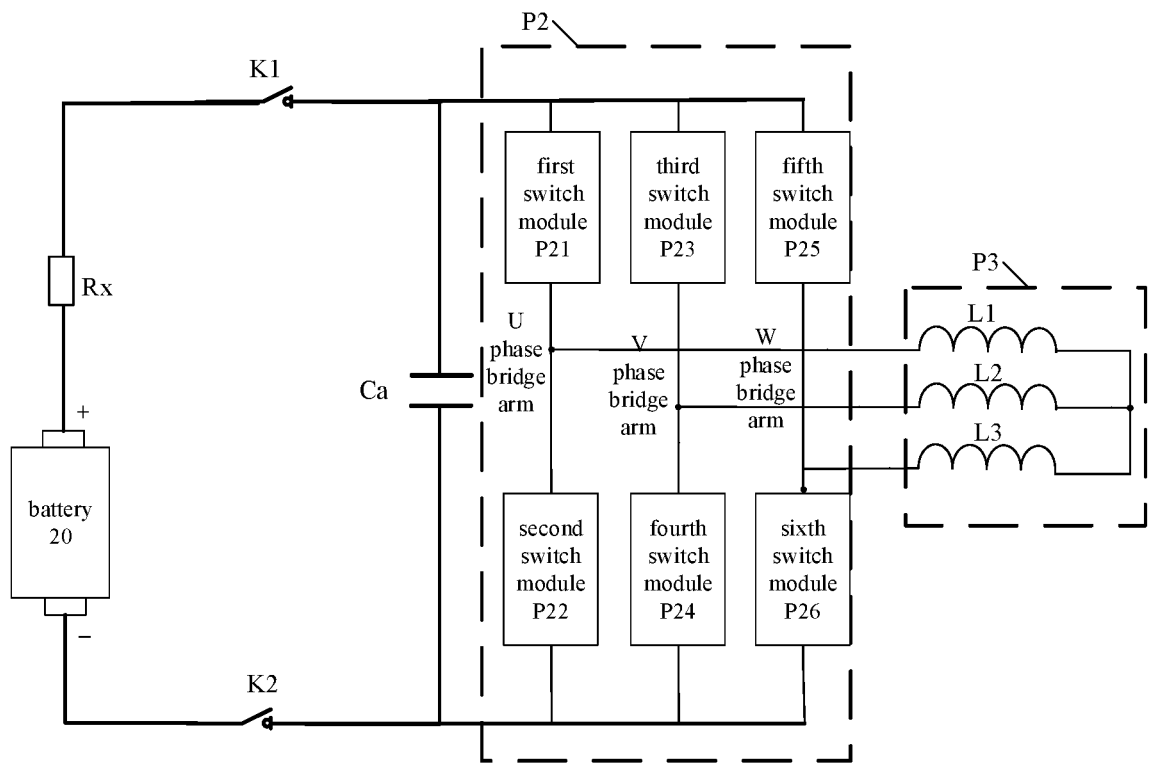
FIG. 5 is a schematic diagram of a battery heating system provided by an embodiment of the present application.

FIG. 5 is a schematic diagram of a battery heating system provided by an embodiment of the present application.

As shown in FIG. 5, the battery heating system may include an inverter P2 connected to a battery 20, and a motor P3 connected to the inverter P2. Exemplarily, the inverter P2 may be connected to a positive electrode of the battery 20 via a main positive switch K1 and a resistor Rx, and may further be connected to a negative electrode of the battery 20 via a main negative switch K2.

For the inverter P2, the specific description is as follows.

The inverter P2 includes three phase bridge arms: a U phase bridge arm, a V phase bridge arm, and a W phase bridge arm. Here, each of the above-mentioned three phase bridge arms has an upper bridge arm and a lower bridge arm, and the upper bridge arm and the lower bridge arm are each provided with a switch module.

For example, as shown in FIG. 5, the switch module of the upper bridge arm of the U phase bridge arm is a first switch module P21, and the switch module of the lower bridge arm of the U phase bridge arm is a second switch module P22. The switch module of the upper bridge arm of the V phase bridge arm is a third switch module P23, and the switch module of the lower bridge arm of the V phase bridge arm is a fourth switch module P24. The switch module of the upper bridge arm of the W phase bridge arm is a fifth switch module P25, and the switch module of the lower bridge arm of the W phase bridge arm is a sixth switch module P26.

In some embodiments, each switch module may include one or more of power switching devices, such as an insulated gate bipolar transistor (Insulated Gate Bipolar Transistor, IGBT) chip, an IGBT module, a metal-oxide-semiconductor field-effect transistor (Metal-Oxide-Semiconductor Field-Effect Transistor, MOSFET) and the like. The combination and connection methods of each IGBT device and MOSFET device in the switch module are not limited here. The material type of the above-mentioned power switching devices is also not limited here. For example, a power switching device made of silicon carbide (i.e., SiC) or other materials can be used. It is worth mentioning that the above-mentioned power switching devices have a diode. Specifically, the diode may be a parasitic diode or a specially set diode. The material type of the diode is also not limited here. For example, a diode made of silicon (i.e., Si), silicon carbide (i.e., SiC) or other materials can be used.

For the motor P3, the specific description is as follows.

As shown in FIG. 5, the windings of the motor P3 may specifically include a U phase winding L1, a V phase winding L2, and a W phase winding L3.

Here, one terminal of the U phase winding L1 is connected to a connection point of the upper bridge arm and the lower bridge arm of the U phase bridge arm. One terminal of the V phase winding L2 is connected to a connection point of the upper bridge arm and the lower bridge arm of the V phase bridge arm. One terminal of the W phase winding L3 is connected to a connection point of the upper bridge arm and the lower bridge arm of the W phase bridge arm.

The other terminal of the U phase winding L1, the other terminal of the V phase winding L2, and the other terminal of the W phase winding L3 are connected together.

In some embodiments, the battery heating system further includes a supporting capacitor Ca connected in parallel with each phase bridge arm of the inverter P2. One terminal of the supporting capacitor Ca is connected to the positive electrode of the battery 20, and the other terminal is connected to the negative electrode of the battery 20. The supporting capacitor Ca is used to absorb a high pulsating voltage and current that may be generated when the switch modules of the inverter P2 are disconnected, so that the voltage fluctuation and current fluctuation in the battery heating system may be kept within an allowable range, and the overshooting of the voltage and current may be avoided.

It should be noted that the battery heating system 11 in the embodiment of the present application may be implemented as a power system of the battery 20, such that the power system of the battery 20 may not only heat the battery 20, but also convert electric energy of battery 20 into mechanical energy to provide power for the power plant, which requires no additional heating device, thereby saving heating costs.

Secondly, for the control device 12 for the battery heating system, the specific description is as follows.

The control device 12 for the battery heating system has a function of controlling the switch modules in the motor. In some embodiments, the control device 12 for the battery heating system may be specifically implemented as a motor control unit (Motor Control Unit, MCU).

In some embodiments, the battery thermal management system further includes a battery management unit.

The battery management unit is connected to the battery for detecting the temperature of the battery. The battery management unit outputs a heating signal to the controller under a condition that the temperature is lower than a temperature threshold. Here, the temperature threshold may be set according to actual scenarios and specific heating requirements, which is not limited.

Figure 6:
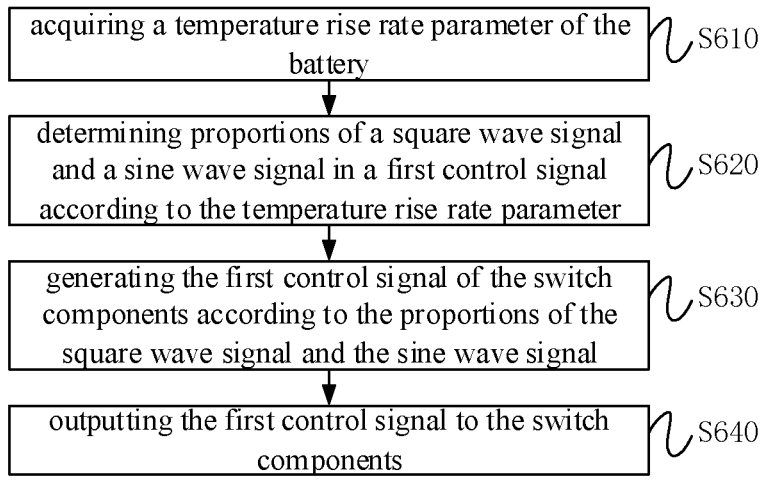
FIG. 6 is a schematic flowchart of a first control method of a battery heating system provided by an embodiment of the present application.

After providing a preliminary understanding of the battery thermal management system and the battery heating system, the embodiments of the present application will describe in detail the control method of the battery heating system provided by the embodiments of the present application in conjunction with the drawings. FIG. 6 is a schematic flowchart of a first control method of a battery heating system provided by an embodiment of the present application. As shown in FIG. 6, the control method of the battery heating system may specifically include S610 to S640.

In S610, a temperature rise rate parameter of a battery is acquired.

In some embodiments, the temperature rise rate parameter of the battery is used to measure a heating efficiency of the battery heating system 11 in a target time period. Here, the temperature rise rate parameter of the battery is positively correlated with the heating efficiency of the battery heating system 11. In other words, the higher the heating efficiency of the battery heating system 11 is, the greater the temperature rise rate parameter of the battery is.

Here, for the target time period, it may be a time period during which the user desires to control the switch components. Exemplarily, in order to enable real-time control of the switch components, the target time period may be a time period having the current time as the cut-off time.

In an example, under a condition that the battery temperature is above zero, the temperature rise rate parameter t of the battery may be a ratio of a temperature Tb at the cut-off time of the target time period to a temperature Ta at a start time of the target time period, that is, t=Tb/Ta.

In another example, in order to accurately calculate the temperature rise rate of a temperature above zero and a temperature below zero, the temperature rise rate parameter t of the battery may be a ratio of a temperature change amount in the target time period to an absolute value |Ta| of the temperature Ta at the start time of the target time period. Here, the temperature change amount in the target time period is a difference between the temperature Tb at the cut-off time of the target time period and the temperature Ta at the start time of the target time period. That is, t=(Tb−Ta)/|Ta|.

In S620, proportions of a square wave signal and a sine wave signal in a first control signal of the switch components are determined according to the temperature rise rate parameter.

In some embodiments, since the heating efficiency of the square wave signal is higher than that of the sine wave signal, and the heating quality of the sine wave signal is higher than that of the square wave signal, the first control signal may be modulated as the square wave signal in S620 when the temperature rise rate parameter is small, that is, when the heating efficiency is low, thereby improving the heating efficiency. Correspondingly, the first control signal may be modulated as the sine wave signal when the temperature rise rate parameter is large, that is, when the heating efficiency is high, thereby improving the heating quality.

Figure 7:
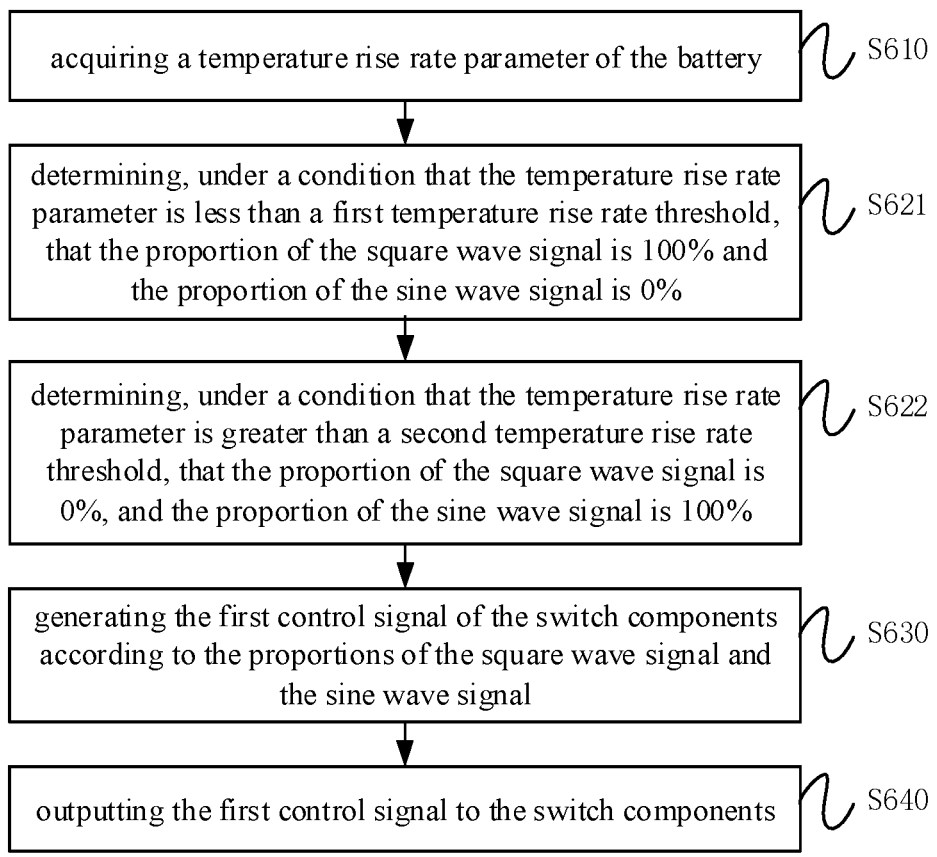
FIG. 7 is a schematic flowchart of a second control method of a battery heating system provided by an embodiment of the present application.

In an example, FIG. 7 is a schematic flowchart of a second control method of a battery heating system provided by an embodiment of the present application. The difference between FIG. 7 and FIG. 6 is that S620 may specifically include S621 and S622.

In S621, under a condition that the temperature rise rate parameter is less than a first temperature rise rate threshold, it is determined that the proportion of the square wave signal is 100% and the proportion of the sine wave signal is 0%.

That is, under a condition that the temperature rise rate parameter is less than the first temperature rise rate threshold, the first control signal is modulated as the square wave signal shown in FIG. 1.

In S622, under a condition that the temperature rise rate parameter is greater than a second temperature rise rate threshold, it is determined that the proportion of the square wave signal is 0% and the proportion of the sine wave signal is 100%.

Here, the first temperature rise rate threshold is less than or equal to the second temperature rise rate threshold.

That is, under a condition that the temperature rise rate parameter is greater than the second temperature rise rate threshold, the first control signal is modulated as the sine wave signal shown in FIG. 2.

In a specific example, under a condition that the first temperature rise rate threshold is equal to the second temperature rise rate threshold, the first control signal is modulated as the square wave when the temperature rise rate parameter of the battery is less than the first temperature rise rate threshold. The first control signal is modulated as the sine wave when the temperature rise rate parameter of the battery is greater than the second temperature rise rate threshold.

In another specific example, under a condition that the first temperature rise rate threshold is not equal to the second temperature rise rate threshold, the first control signal may be modulated as the hybrid wave including the sine wave and the square wave. Here, the proportions of the sine wave and the square wave in the hybrid wave may be preset proportions, or may be set according to user expectations or actual needs. For example, under a condition that the user desires to improve the heating efficiency, the proportion of the square wave may be greater than that of the sine wave. Under a condition that the user desires to improve the heating quality, the proportion of the sine wave may be greater than that of the square wave. Alternatively, the proportions of the sine wave and the square wave in the hybrid wave may be determined based on a control duration of the sine wave and a control duration of the square wave desired by the user.

Figure 8:
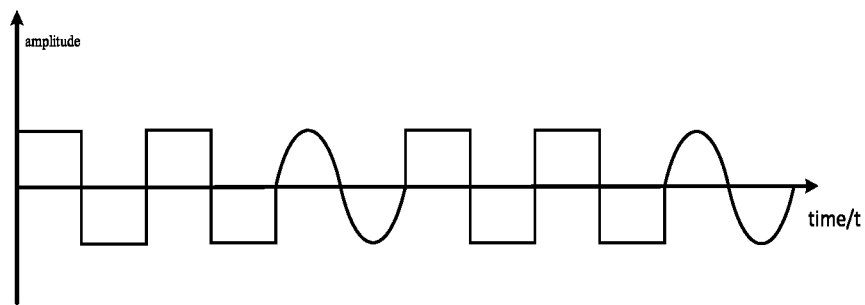
FIG. 8 is a waveform schematic diagram of an exemplary hybrid wave provided by an embodiment of the present application.

Exemplarily, under a condition that the total control duration of the square wave desired by the user is 20 s and the total control duration of the sine wave is 10 s, the ratio of the square wave and the sine wave may be controlled to be 2:1. That is, under a condition that the switching frequency of the switch module is 10 Hz, the switch module may be switched to be controlled by the sine wave for 0.1 s after being controlled by the square wave for 0.2 s, and this may be repeat 100 times. FIG. 8 is a waveform diagram of an exemplary hybrid wave provided by an embodiment of the application. Under a condition that the hybrid wave includes 100 control periods, the waveform of each control period may be seen in FIG. 8, that is, each control period includes two periods of the square wave signal and one period of the sine wave signal.

In another example, when the temperature rise rate parameter is greater than the first temperature rise rate threshold and less than the second temperature rise rate threshold, the proportions of the square wave signal and the sine wave signal may also be determined according to the temperature rise rate parameter.

Figure 9:
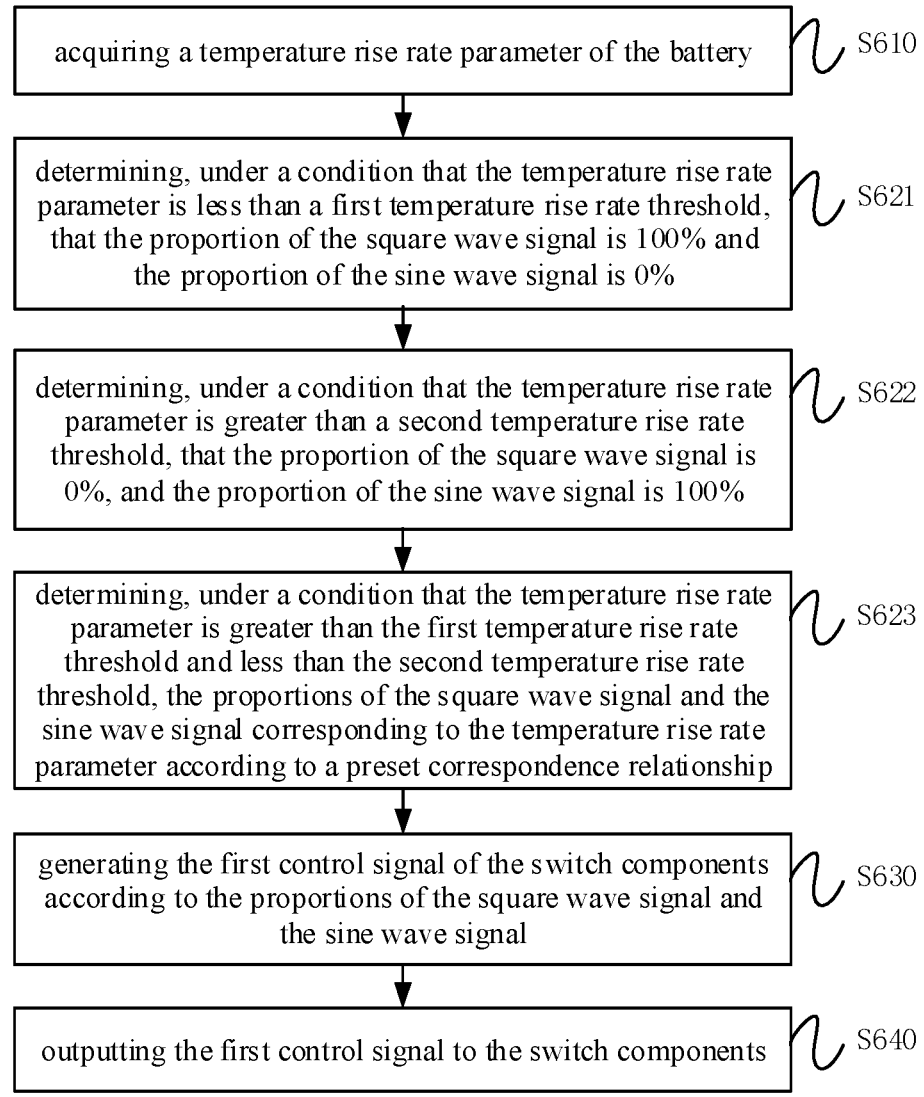
FIG. 9 is a schematic flowchart of a third control method of a battery heating system provided by an embodiment of the present application.

Correspondingly, FIG. 9 is a schematic flowchart of a third control method of a battery heating system according to an embodiment of the present application. The difference between FIG. 9 and FIG. 7 is that S620 may further includes S623.

In S623, under a condition that the temperature rise rate parameter is greater than the first temperature rise rate threshold and less than the second temperature rise rate threshold, the proportions of the square wave signal and the sine wave signal corresponding to the temperature rise rate parameter are determined according to a preset correspondence relationship.

Here, in the preset correspondence relationship, the proportion of the square wave signal decreases as the temperature rise rate parameter increases, and the proportion of the sine wave signal increases as the temperature rise rate parameter increases.

In S630, the first control signal of the switch components is generated according to the proportions of the square wave signal and the sine wave signal.

Here, the switch components in the embodiments of the present application refer to switches that need to be intermittently turned on during the heating process. Specifically, the switch components may include one of the switch module of the upper bridge arm and the switch module of the lower bridge arm of each phase bridge arm of the three phase bridge arms in the inverter P2.

In the heating process of the embodiments of the present application, the switch module of the upper bridge arm and the switch module of the lower bridge arm of each phase bridge need to be in different on-off states. In the specific implementation process, "1" or "0" may be used to indicate the on-off states of the switch modules in one phase bridge arm. Here, "1" means that when the switch module of the upper bridge arm of the phase bridge arm is in the on state, the switch module of the lower bridge arm needs to be in the off state. "0" means that when the switch module of the upper bridge arm of the phase bridge arm is in the off state, the switch module of the lower bridge arm needs to be in the on state.

Correspondingly, the three phase bridge arms correspond to eight switch states, namely: 000, 001, 010, 011, 100, 101, 110, and 111. During the heating process, the switch components may switch between at least two of the eight switch states.

In this embodiment, the first control signal may be input to the switch components that are turned on in the eight switch states, and a low-level signal or a high-level signal may be input to the switch components that should be turned off, so as to turn them off.

In S640, the first control signal is output to the switch components to control switching on or off of the switch components via the first control signal, so as to generate an alternating current in a loop connecting the battery and the motor and heat the battery using the alternating current.

According to the control method of the battery heating system in the embodiment of the present application, the proportions of the square wave signal and the sine wave signal in the first control signal may be determined according to the temperature rise rate parameter of the battery, and the first control signal of the switch components may be generated according to the proportions of the square wave signal and the sine wave signal. Because that the square wave signal can improve the heating efficiency and the sine wave signal can reduce the rotor eddy-current loss and thereby improve the heating quality, the embodiments of the present application can take into account both the heating quality and the heating efficiency by determining the proportions of the square wave signal and the sine wave signal in the first control signal through adjusting the temperature rise rate parameter of the battery.

In some embodiments, in order to further improve the heating efficiency, the rotor may be controlled to remain in a stationary state.

Correspondingly, the control method of the battery heating system provided by the embodiment of the present application further includes steps A1 to A3.

In Step A1, a target electrical parameter of the alternating current within a target period is acquired.

Here, the target electrical parameter may be a three-phase current collected from a three-phase connection line between the inverter and the motor.

In Step A2, the target electrical parameter is decomposed to obtain a q-axis vector and a d-axis vector corresponding to the target electrical parameter and perpendicular to each other.

Specifically, under a condition that the target electrical parameter is a sampling current, the sampling current may be converted from an abc coordinate system to a dq coordinate system, and then a q-axis vector and a d-axis vector of the sampling current may be obtained by decomposing the sampling current in the dq coordinate system.

In Step A3, controlling the q-axis vector to zero, and decomposing the d-axis vector into two preset basic vectors adjacent to the d-axis vector according to a position of the d-axis vector in a target vector space.

Firstly, for adjusting the q-axis vector to zero, the specific description is as follows.

Specifically, a given value of the q-axis vector may be set to zero. In an embodiment, a given value of the d-axis vector may be set according to specific scenarios and actual requirements, and will not be repeated here. Exemplarily, the given value of the d-axis vector may be determined according to a preset safe current.

Secondly, for the target vector space and the preset basic vectors, the specific description is as follows.

Here, the target vector space includes a plurality of preset basic vectors, and the preset basic vectors are voltage vectors of a multi-phase stator winding corresponding to respective different on-off states of the switch components.

Figure 10:
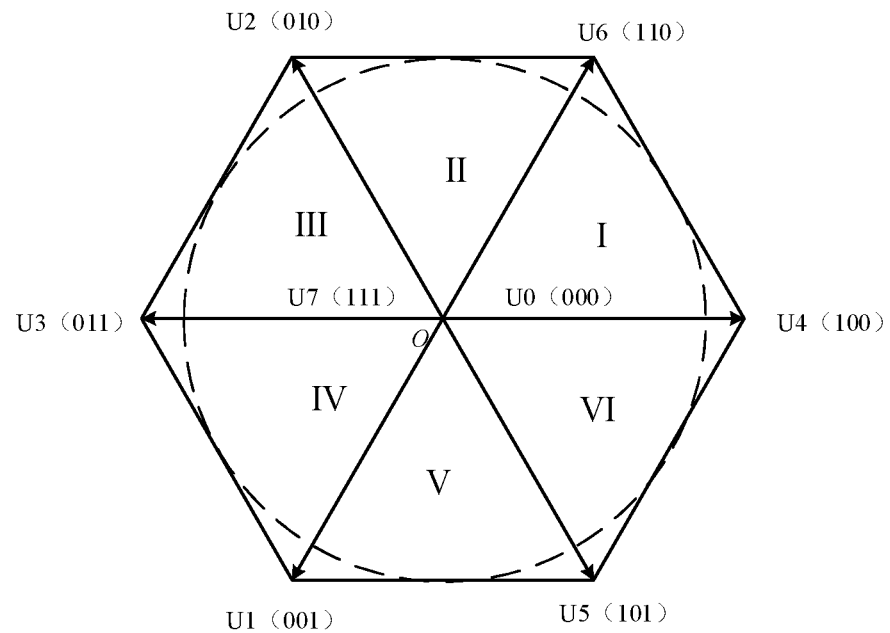
FIG. 10 is a schematic diagram of a target vector space provided by an embodiment of the present application.

FIG. 10 is a schematic diagram of a target vector space. As shown in FIG. 10, six arrows respectively represent six voltage vectors corresponding to different switch states, 001, 010, 011, 110, 101, and 100. Because that the voltage vectors corresponding to the switch states of 000 and 111 are zero vectors, the six voltage vectors may divide the target vector space into six sectors I to VI.

Further, for the decomposition of the d-axis vector, the corresponding two preset basic vectors may be determined according to the position of the d-axis vector in the target vector space, and a retention duration of the corresponding switch state of each preset basic vector may be determined. Exemplarily, under a condition that the d-axis vector is in the sector I, the corresponding preset basic vectors are 100 and 110. The closer the d-axis vector is to the vector 100, the longer the switch state remains at 100.

Correspondingly, S630 may specifically include:

outputting the first control signal to the switch components according to on-off states of the switch components respectively corresponding to the two adjacent preset basic vectors, so as to enable the switch components to switch to the corresponding on-off states of the switch components according to the first control signal and maintain a corresponding duration.

Regarding the feasibility of increasing the heating efficiency by controlling the rotor to remain in the stationary state, the specific description is as follows.

Figure 11:
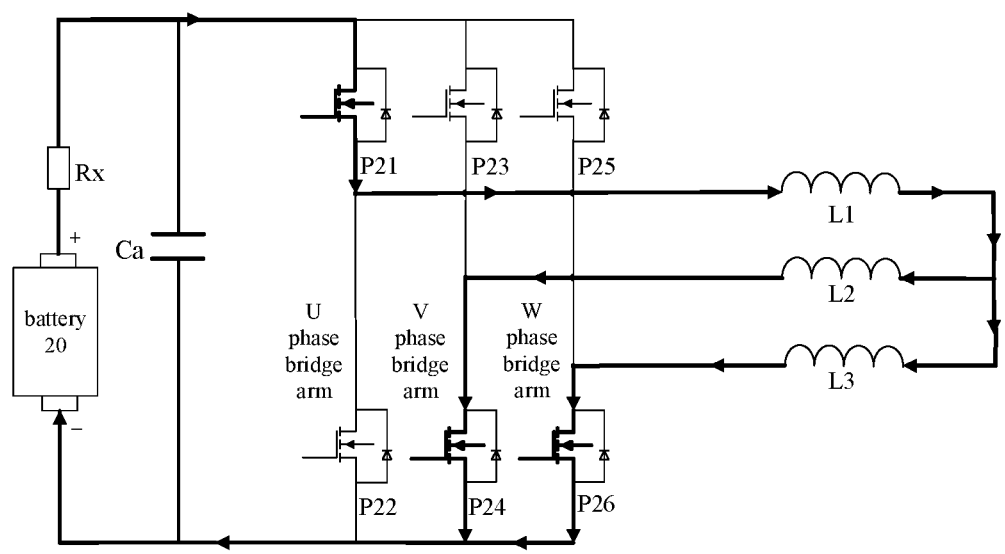
FIG. 11 is a schematic diagram of an exemplary battery conduction loop provided by an embodiment of the present application.

Taking the switch state "100" as an example, FIG. 11 is a schematic diagram of an exemplary battery conduction loop provided by an embodiment of the present application. As shown in FIG. 11, when the switch state is 100, the first switch module P21, the fourth switch module P24, and the sixth switch module P26 are turned on, and the second switch module P22, the third switch module P23, and the fifth switch module P25 are turned off. At this time, there are two conduction loops as follows.

Conduction loop 1: the battery 20→the first switch module P21→the U phase winding L1→the V phase winding L2→the fourth switch module P24→the battery 20.

Conduction loop 2: the battery 20→the first switch module P21→the U phase winding L1→the W phase winding L3→the sixth switch module P26→the battery 20.

Figure 12:
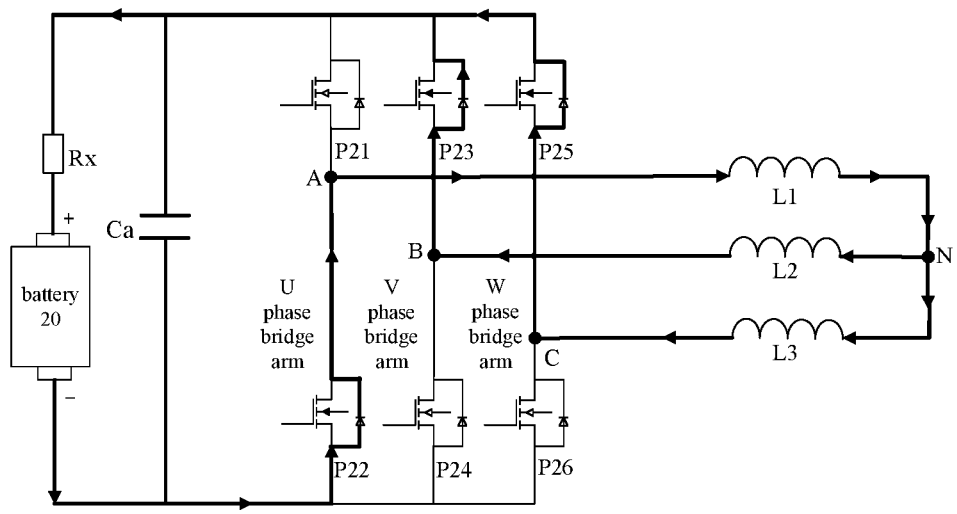
FIG. 12 is a schematic diagram of another exemplary battery conduction loop provided by an embodiment of the present application.

When it is necessary to switch to other switching states, due to the principle that the direction of the inductor current does not change, the battery conduction loop is shown in FIG. 12, which is a schematic diagram of another exemplary battery conduction loop provided by an embodiment of the present application.

Conduction loop 3: the U phase winding L1→the V phase winding L2→the body diode of the third switching module P23→the battery 20→the body diode of the second switching module P22→the U phase winding L1.

Conduction loop 4: the U phase winding L1→the W phase winding L3→the body diode of the fifth switch module P25→the battery 20→the body diode of the second switch module P22→the U phase winding L1.

Under a condition that the impedance of each phase winding of the motor is Z, then:

$$\left(Z + \frac{Z*Z}{Z+Z}\right)i = U_{dc} \quad (1)$$

wherein i is a bus current and $U_{dc}$ is a bus voltage.

The voltages of the three points A, B, and C relative to the neutral point N respectively satisfy formulas (2) to (4):

$$U_{AN} = Z*i = \frac{2U_{dc}}{3} \quad (2)$$

$$U_{BN} = -\frac{Z}{2}*i = -\frac{U_{dc}}{3} \quad (3)$$

$$U_{CN} = -\frac{Z}{2}*i = -\frac{U_{dc}}{3} \quad (4)$$

wherein, UAN is the voltage of point A relative to the neutral point N, UBN is the voltage of point B relative to the neutral point N, and UCN is the voltage of point C relative to the neutral point N.

Similarly, the alternating current side voltage corresponding to the other seven switch states may be calculated, and the calculation results are shown in Table 1.

TABLE 1

|     | $U_{AN}$ | $U_{BN}$ | $U_{CN}$ |
|-----|----------|----------|----------|
| 000 | 0 | 0 | 0 |
| 001 | $-U_{dc}/3$ | $-U_{dc}/3$ | $2\,U_{dc}/3$ |
| 010 | $-U_{dc}/3$ | $2\,U_{dc}/3$ | $-U_{dc}/3$ |
| 011 | $-2\,U_{dc}/3$ | $U_{dc}/3$ | $U_{dc}/3$ |
| 100 | $-2\,U_{dc}/3$ | $-U_{dc}/3$ | $-U_{dc}/3$ |
| 101 | $U_{dc}/3$ | $-2\,U_{dc}/3$ | $U_{dc}/3$ |
| 110 | $U_{dc}/3$ | $U_{dc}/3$ | $-2\,U_{dc}/3$ |
| 111 | 0 | 0 | 0 |

Under a condition that no special control is performed on the q-axis vector, a circular rotating magnetic field will be formed in the process of controlling the motor by switching between multiple switch states. At this time, the motor is in a linear modulation area, and the amplitude of the fundamental wave of the phase voltage output by the inverter is the radius of the dashed circle in FIG. 10. At this time, the amplitude of the phase voltage output by the inverter satisfies the formula (5):

$$\frac{2U_{dc}}{3}*\cos30° = \frac{U_{dc}}{\sqrt{3}} \quad (5)$$

The applicant has found through a lot of research that when the rotor of the motor is controlled to remain in the stationary state, the inverter always remains in a combined state of the six basic space vectors of 001, 010, 011, 100, 101, 110 and a zero vector during the battery heating process. At this time, the amplitude of the output voltage of the inverter is the regular hexagon shown in FIG. 10, and the output phase voltage is 2Udc/3. Compared with the solution that does not control the rotor, the output voltage of the inverter is increased by about 15%.

In some embodiments, in order to further improve the heating efficiency, the direction of the magnetic field of the stator winding and the direction of the magnetic field of the rotor winding may be controlled to be consistent.

For the feasibility of this method, the specific description is as follows.

When the direction of the magnetic field generated by the stator winding is always consistent with the direction of the magnetic field of the rotor, it is ensured that the rotor will not rotate during the heating process. Therefore, the stator winding will not induce a back-EMF, and the bus current will be much larger than that under the control strategy of rotating the rotor, thereby improving the heating efficiency.

In some embodiments, the battery thermal management system further includes a position sensor, and the motor further includes a rotor.

The method further includes:

receiving position information of the rotor detected by the position sensor, and under a condition that a position of the rotor is not within a preset deviation range, outputting an alarm signal, and/or outputting a second control signal to the switch components to adjust the on-off states and durations of the switch components, so as to keep the rotor in a stationary state. Here, the preset deviation range may be set according to specific scenarios and actual requirements, and is not be repeated here.

In an example, the position sensor may detect the position information of the rotor in real time or at a regular interval, and transmit the position information of the rotor to the controller.

With the position information of the rotor detected by the position sensor, the control effect may be further judged. The q-axis vector is set to zero for control according to the above embodiment, and theoretically, the rotor should remain in the stationary state during the heating process. Nevertheless, the position of the rotor may be changed due to control errors. Under a condition that the position of the rotor is not within the preset deviation range, the control errors may be determined to be too large. At this time, the controller may send out an alarm signal to remind the user to check the control process of the battery thermal management system, or the controller may automatically adjust the on-off states and durations of the switch components to keep the rotor of the motor in the stationary state. The stationary state in this application refers to a relative stationary state, that is, the position deviation of the rotor does not exceed the preset deviation range.

By receiving the position information of the rotor of the motor detected by the position sensor and taking corresponding measures to calibrate the control process, the controller may adjust the control deviation in time to ensure that the battery is heated by the alternating current with a preset desired waveform.

In some embodiments, the voltage vectors of the multi-phase stator winding corresponding to the respective different on-off states of the switch components further include a zero vector. Here, the zero vector may be used to supplement the time that is short from the switch period, such that the two adjacent basic vectors can combine the required direction and magnitude of the current.

At this time, a sum of durations of the on-off states of the switch components respectively corresponding to the two adjacent preset basic vectors and a duration of a state of the switch components corresponding to the zero vector is equal to a duration of the target period.

In an example, under a condition that the d-axis vector is synthesized by two basic vectors U1 and U2 in the target time period T, a duration corresponding to M1 is T1, a duration corresponding to M2 is T2, and T3 is a duration of a state of 000, then T1+T2+T3=T.

In one embodiment, the zero vector may be the switch state 000 or the switch state 111. Specifically, the switch state may be switched to 000 or 111 according to a previous switch state before switching to the zero vector. Specifically, under a condition that a certain switch state may be switched to 111 by switching only one switch, and may be switched to 000 by switching two switches, in order to reduce the switch loss, the zero vector after switching the certain switch state may be 111. Correspondingly, under a condition that a certain switch state may be switched to 000 by switching only one switch, and may be switched to 111 by switching two switches, the zero vector after switching the certain switch state may be 000.

Based on the same application concept, in addition to providing the control method of the battery heating system, the embodiments of the present application also provide a corresponding control device of the battery heating system.

The control device of the battery heating system according to the embodiment of the present application will be described in detail in the followings with reference to the drawings.

Figure 13:
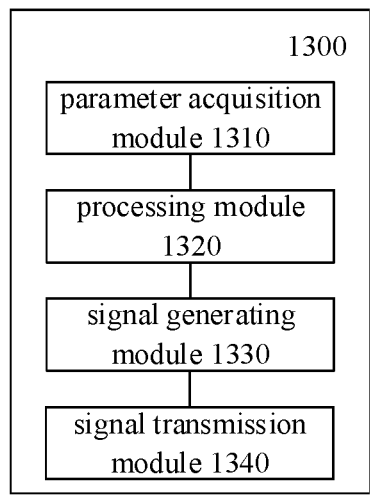
FIG. 13 is a schematic structural diagram of a control device of a battery heating system provided by an embodiment of the present application.

FIG. 13 is a schematic structural diagram of a control device of a battery heating system provided by an embodiment of the present application. As shown in FIG. 13, the control device 1300 of the battery heating system includes:

a parameter acquisition module 1310 configured to acquire a temperature rise rate parameter of the battery;

a processing module 1320 configured to determine proportions of a square wave signal and a sine wave signal in a first control signal of the switch components according to the temperature rise rate parameter;

a signal generating module 1330 configured to generate the first control signal of the switch components according to the proportions of the square wave signal and the sine wave signal;

a signal transmission module 1340 configured to output the first control signal to the switch components to control switching on and or off of the switch components via the first control signal, so as to generate an alternating current in a loop connecting the battery and the motor and heat the battery using the alternating current.

In some embodiments of the present application, the processing module 1320 includes:

a first processing unit configured to determine, under a condition that the temperature rise rate parameter is less than a first temperature rise rate threshold, that the proportion of the square wave signal is 100% and the proportion of the sine wave signal is 0%;

a second processing unit configured to determine, under a condition that the temperature rise rate parameter is greater than a second temperature rise rate threshold, that the proportion of the square wave signal is 0%, and the proportion of the sine wave signal is 100%, wherein the first temperature rise rate threshold is less than or equal to the second temperature rise rate threshold.

In some embodiments of the present application, the processing module 1320 further includes:

a third processing unit configured to determine, under a condition that the temperature rise rate parameter is greater than the first temperature rise rate threshold and less than the second temperature rise rate threshold, the proportions of the square wave signal and the sine wave signal corresponding to the temperature rise rate parameter according to a preset correspondence relationship, wherein in the preset correspondence relationship, the proportion of the square wave signal decreases as the temperature rise rate parameter increases, and the proportion of the sine wave signal increases as the temperature rise rate parameter increases.

In some embodiments of the present application, the control device 1300 of the battery heating system further includes:

an electrical parameter acquisition module configured to acquire a target electrical parameter of the alternating current within a target period;

a decomposition module configured to decompose the target electrical parameter to obtain a q-axis vector and a d-axis vector corresponding to the target electrical parameter and perpendicular to each other;

a modulation module configured to control the q-axis vector to be zero, and decompose the d-axis vector into two preset basic vectors adjacent to the d-axis vector according to a position of the d-axis vector in a target vector space, wherein the target vector space includes a plurality of preset basic vectors, and the preset basic vectors are voltage vectors of a multi-phase stator winding corresponding to respective different on-off states of the switch components;

correspondingly, the signal generating module 1330 is specifically configured to:

output the first control signal to the switch components according to on-off states of the switch components respectively corresponding to the two adjacent preset basic vectors, so as to enable the switch components to switch to the corresponding on-off states of the switch components according to the first control signal and maintain a corresponding duration.

In some embodiments of the present application, the battery thermal management system further includes a position sensor, and the motor further includes a rotor;

after outputting the first control signal to the switch components according to magnitudes of the two adjacent preset basic vectors and the respectively corresponding on-off states of the switch components, the signal generating module 1330 is further configured to:

receiving position information of the rotor detected by the position sensor, and under a condition that a position of the rotor is not within a preset deviation range, outputting an alarm signal, and/or outputting a second control signal to the switch components to adjust the on-off states and durations of the switch components, so as to keep the rotor in a stationary state.

In some embodiments of the present application, the voltage vectors of the multi-phase stator winding corresponding to the respective different on-off states of the switch components further comprise a zero vector;

a sum of durations of the on-off states of the switch components respectively corresponding to the two adjacent preset basic vectors and a duration of a state of the switch components corresponding to the zero vector is equal to a duration of the target period.

According to the control device of the battery heating system in the embodiment of the present application, the proportions of the square wave signal and the sine wave signal in the first control signal may be determined according to the temperature rise rate parameter of the battery, and the first control signal of the switch components may be generated according to the proportions of the square wave signal and the sine wave signal. Because that the square wave signal can improve the heating efficiency and the sine wave signal can reduce the rotor eddy-current loss and thereby improve the heating quality, the embodiments of the present application can take into account both the heating quality and the heating efficiency by determining the proportions of the square wave signal and the sine wave signal in the first control signal through adjusting the temperature rise rate parameter of the battery.

The other details of the control device of the battery heating system according to the embodiments of the present application are similar to the control method of the battery heating system described above in conjunction with the examples shown in FIGS. 6-12, and can achieve the corresponding technical effects, which are not repeated here for the sake of brevity.

Figure 14:
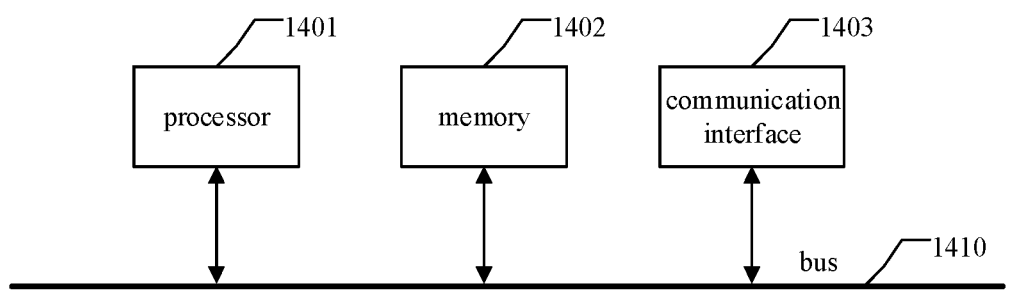
FIG. 14 illustrates a schematic diagram of a hardware structure of a control device of a battery heating system provided by an embodiment of the present application.

FIG. 14 illustrates a schematic diagram of a hardware structure of a control device of a battery heating system provided by an embodiment of the present application.

The control device of the battery heating system may include a 1401 and a memory 1402 storing computer program instructions.

Specifically, the foregoing processor 1401 may include a central processing unit (Central Processing Unit, CPU) or an application specific integrated circuit (Application Specific Integrated Circuit, ASIC), or may be configured as one or more integrated circuits implementing the embodiments of the present application.

The memory 1402 may include a large-capacity memory for data or instructions. For example and without limitation, the memory 1402 may include a hard disk drive (Hard Disk Drive, HDD), a floppy disk drive, a flash memory, an optical disk, a magneto-optical disk, a magnetic tape, or a universal serial bus (Universal Serial Bus, USB) drive, or a combination of two or more thereof. In some examples, the memory 1402 may include a removable or non-removable (or fixed) medium, or the memory 1402 is a non-volatile solid-state memory. In some embodiments, the memory 1402 may be inside or outside the control device of the battery heating system.

In some examples, the memory 1402 may be a read only memory (Read Only Memory, ROM). In one example, the ROM may be a mask-programmed ROM, a programmable ROM (PROM), an erasable PROM (EPROM), an electrically erasable PROM (EEPROM), an electrically rewriteable ROM (EAROM), or a flash memory or a combination of two or more thereof.

The memory 1402 may include a read only memory (ROM), a random access memory (RAM), a magnetic disk storage media device, an optical storage media device, a flash memory device, an electrical, optical, or other physical/tangible memory storage device. Therefore, the memory includes one or more tangible (non-transitory) computer-readable storage media (e.g., memory devices) encoded with software including computer-executable instructions, and the software, when executed (e.g., by one or more processors), is operable to perform the operations described with reference to the method according to one aspect of the present disclosure.

The processor 1401 reads and executes the computer program instructions stored in the memory 1402 to implement the methods/steps Sxxx to Syyy in the embodiments shown in Fig. yy, and achieve the corresponding technical effects of the methods/steps in the embodiments shown in Fig. yy, which is not repeated here for the sake of brevity.

In an example, the control device of the battery heating system may further include a communication interface 1403 and a bus 1410. Here, as shown in FIG. 14, the processor 1401, the memory 1402, and the communication interface 1403 are connected through the bus 1410 and complete communication with each other.

The communication interface 1403 is mainly configured to implement communication between various modules, apparatuses, units and/or devices in the embodiments of the present application.

The bus 1410 includes hardware, software, or both, and couples the components of the battery heating system to each other. By way of example and without limitation, the bus may include an accelerated graphics port (Accelerated Graphics Port, AGP) or other graphics bus, an enhanced industry standard architecture (Extended Industry Standard Architecture, EISA) bus, a front side bus (Front Side Bus, FSB), a hyper transport (Hyper Transport, HT) interconnection, an industry standard architecture (Industry Standard Architecture, ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a serial advanced technology attachment (SATA) bus, a video electronics standards association local (VLB) bus or other suitable bus, or a combination of two or more thereof. Where appropriate, the bus 1410 may include one or more buses. Although the embodiments of the present application describe and show a specific bus, the present application considers any suitable bus or interconnect.

The control device of the battery heating system may execute the control method of the battery heating system in the embodiments of the present application, so as to realize the control method and device of the battery heating system described with reference to FIGS. 6-13.

In addition, in conjunction with the control methods of the battery heating system in the foregoing embodiments, the embodiments of the present application may provide a computer storage medium for implementation. The computer storage medium stores computer program instructions; the computer program instructions, when executed by the processor, implement any one of the control methods of the battery heating system in the foregoing embodiments.

It should be clear that the present application is not limited to the specific configuration and processing described above and shown in the drawings. For the sake of brevity, a detailed description of the known method is omitted here. In the above embodiments, several specific steps are described and shown as examples. Nevertheless, the method of the present application is not limited to the specific steps described and shown, and those skilled in the art can make various changes, modifications and additions, or can change the order between the steps after understanding the spirit of the present application.

The functional blocks shown in the above structural block diagram can be implemented as hardware, software, firmware, or a combination thereof. When implemented in hardware, the functional blocks can be, for example, an electronic circuit, an application specific integrated circuit (Application Specific Integrated Circuit, ASIC), appropriate firmware, a plug-in, a functional card, and so on. When implemented in software, the elements of the present application are programs or code segments used to perform required tasks. The programs or code segments may be stored in a machine-readable medium, or transmitted over a transmission medium or a communication link through a data signal carried in a carrier wave. The "Machine-readable medium" may include any medium that can store or transmit information. Examples of the machine-readable medium include an electronic circuit, a semiconductor memory device, an ROM, a flash memory, an erasable ROM (EROM), a floppy disk, a CD-ROM, an optical disk, a hard disk, an optical fiber medium, a radio frequency (RF) link, etc. The code segments can be downloaded via a computer network such as the Internet, the Intranet, and so on.

It should be noted that the exemplary embodiments mentioned in the present application describe some methods or systems based on a series of steps or devices. However, the present application is not limited to the order of the above steps, that is, the steps may be performed in the order mentioned in the embodiment or in an order different from that in the embodiment, or several steps may be performed at the same time.

Various aspects of the present disclosure are described above with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing devices to produce a machine that enables the implementation of functions/actions specified in one or more blocks of the flowcharts and/or block diagrams by executing these instructions via the processor of the computer or other programmable data processing devices. Such a processor may be, but not limited to, a general purpose processor, a dedicated processor, a special application processor, or a field programmable logic circuit. It can also be understood that each block in the block diagrams and/or flowcharts and combinations of blocks in the block diagrams and/or flowcharts can also be implemented by dedicated hardware that performs the specified functions or actions, or can be implemented by a combination of dedicated hardware and computer instructions.

What is claimed is:

1. A control method of a battery thermal management system, wherein the battery thermal management system comprises a battery heating system, the battery heating system comprises an inverter and a motor, and the motor is connected to a battery via switch components in the inverter; the method comprises:
    acquiring a temperature rise rate parameter of the battery;
    determining proportions of a square wave signal and a sine wave signal in a first control signal of the switch components according to the temperature rise rate parameter;
    generating the first control signal of the switch components according to the proportions of the square wave signal and the sine wave signal;
    outputting the first control signal to the switch components to control switching on or off of the switch components via the first control signal, so as to generate an alternating current in a loop connecting the battery and the motor and heat the battery using the alternating current.

2. The control method of the battery thermal management system according to claim 1, wherein the determining proportions of a square wave signal and a sine wave signal in a first control signal of the switch components according to the temperature rise rate parameter comprises:
    determining, under a condition that the temperature rise rate parameter is less than a first temperature rise rate threshold, that the proportion of the square wave signal is 100% and the proportion of the sine wave signal is 0%;
    determining, under a condition that the temperature rise rate parameter is greater than a second temperature rise rate threshold, that the proportion of the square wave signal is 0%, and the proportion of the sine wave signal is 100%,
    wherein the first temperature rise rate threshold is less than or equal to the second temperature rise rate threshold.

3. The control method of the battery thermal management system according to claim 2, wherein the determining proportions of a square wave signal and a sine wave signal in a first control signal of the switch components according to the temperature rise rate parameter further comprises:
    determining, under a condition that the temperature rise rate parameter is greater than the first temperature rise rate threshold and less than the second temperature rise rate threshold, the proportions of the square wave signal and the sine wave signal corresponding to the temperature rise rate parameter according to a preset correspondence relationship,
    wherein in the preset correspondence relationship, the proportion of the square wave signal decreases as the temperature rise rate parameter increases, and the proportion of the sine wave signal increases as the temperature rise rate parameter increases.

4. The control method of the battery thermal management system according to claim 1, wherein before the generating the first control signal of the switch components according to the proportions of the square wave signal and the sine wave signal, the method further comprises:
    acquiring a target electrical parameter of the alternating current within a target period;
    decomposing the target electrical parameter to obtain a q-axis vector and a d-axis vector corresponding to the target electrical parameter and perpendicular to each other;
    controlling the q-axis vector to be zero, and decomposing the d-axis vector into two preset basic vectors adjacent to the d-axis vector according to a position of the d-axis vector in a target vector space, wherein the target vector space comprises a plurality of preset basic vectors, and the preset basic vectors are voltage vectors of a multiphase stator winding corresponding to respective different on-off states of the switch components;

wherein the generating the first control signal of the switch components according to the proportions of the square wave signal and the sine wave signal specifically comprises:
outputting the first control signal to the switch components according to on-off states of the switch components respectively corresponding to the two adjacent preset basic vectors, so as to enable the switch components to switch to the corresponding on-off states of the switch components according to the first control signal and maintain a corresponding duration.

5. The control method of the battery thermal management system according to claim 4, wherein the battery thermal management system further comprises a position sensor, and the motor further comprises a rotor;
after outputting the first control signal to the switch components according to on-off states of the switch components respectively corresponding to the two adjacent preset basic vectors, the method further comprises:
receiving position information of the rotor detected by the position sensor, and under a condition that a position of the rotor is not within a preset deviation range, outputting an alarm signal, and/or outputting a second control signal to the switch components to adjust the on-off states and durations of the switch components, so as to keep the rotor in a stationary state.

6. The control method of the battery thermal management system according to claim 5, wherein the voltage vectors of the multi-phase stator winding corresponding to the respective different on-off states of the switch components further comprise a zero vector;
a sum of durations of the on-off states of the switch components respectively corresponding to the two adjacent preset basic vectors and a duration of a state of the switch components corresponding to the zero vector is equal to a duration of the target period.

7. The control method of the battery thermal management system according to claim 4, wherein the voltage vectors of the multi-phase stator winding corresponding to the respective different on-off states of the switch components further comprise a zero vector;
a sum of durations of the on-off states of the switch components respectively corresponding to the two adjacent preset basic vectors and a duration of a state of the switch components corresponding to the zero vector is equal to a duration of the target period.

8. A control device of a battery heating system, wherein the battery heating system comprises an inverter and a motor, and the motor is connected to a battery via switch components in the inverter;
the control device comprises:
a parameter acquisition module configured to acquire a temperature rise rate parameter of the battery;
a processing module configured to determine proportions of a square wave signal and a sine wave signal in a first control signal of the switch components according to the temperature rise rate parameter;
a signal generating module configured to generate the first control signal of the switch components according to the proportions of the square wave signal and the sine wave signal;
a signal transmission module configured to output the first control signal to the switch components to control switching on or off of the switch components via the first control signal, so as to generate an alternating current in a loop connecting the battery and the motor and heat the battery using the alternating current.

9. A battery thermal management system, wherein the system comprises:
a battery heating system and a controller;
wherein the battery heating system comprises an inverter and a motor, the motor comprises a multi-phase stator winding, and the multi-phase stator winding is connected to a battery via switch components in the inverter; and
the controller is configured to execute the method according to claim 1.

10. The battery thermal management system according to claim 9, wherein the system further comprises a battery management unit;
the battery management unit is connected to the battery for detecting a temperature of the battery, and the battery management unit outputs a heating signal to the controller under a condition that the temperature is lower than a temperature threshold.

11. The battery thermal management system according to claim 9, wherein the system further comprises a position sensor;
the position sensor is connected to a rotor of the motor for detecting position information of the rotor and outputting the position information to the controller.

12. A control device of a battery heating system, wherein the control device comprises a processor and a memory storing computer program instructions, and the battery heating system comprises an inverter and a motor, and the motor is connected to a battery via switch components in the inverter;
the processor reads and executes the computer program instructions to:
acquire a temperature rise rate parameter of the battery;
determine proportions of a square wave signal and a sine wave signal in a first control signal of the switch components according to the temperature rise rate parameter;
generate the first control signal of the switch components according to the proportions of the square wave signal and the sine wave signal;
output the first control signal to the switch components to control switching on or off of the switch components via the first control signal, so as to generate an alternating current in a loop connecting the battery and the motor and heat the battery using the alternating current.

13. A non-transitory computer readable storage medium having computer programs stored thereon, wherein the computer programs are executable by a processor of a control device of a battery heating system, and the battery heating system comprises an inverter and a motor, and the motor is connected to a battery via switch components in the inverter, and wherein the computer programs, when executed by the processor, cause the processor to:
acquire a temperature rise rate parameter of the battery;
determine proportions of a square wave signal and a sine wave signal in a first control signal of the switch components according to the temperature rise rate parameter;
generate the first control signal of the switch components according to the proportions of the square wave signal and the sine wave signal;
output the first control signal to the switch components to control switching on or off of the switch components via the first control signal, so as to generate an alternating current in a loop connecting the battery and the motor and heat the battery using the alternating current.

* * * * *